United States Patent
Broten

(10) Patent No.: US 6,206,177 B1
(45) Date of Patent: Mar. 27, 2001

(54) GRAIN AUGER BEARING DRIVE MECHANISM

(76) Inventor: James O. Broten, 1637 106th Ave. SE., Dazey, ND (US) 58429

( * ) Notice: Subject to any disclaimer, the term of this patent is extended or adjusted under 35 U.S.C. 154(b) by 0 days.

(21) Appl. No.: 09/407,559

(22) Filed: Sep. 28, 1999

(51) Int. Cl.[7] .................................................. B65G 33/32
(52) U.S. Cl. ............................................................ 198/672
(58) Field of Search .................................. 198/672, 155, 198/657

(56) References Cited

U.S. PATENT DOCUMENTS

| | | | | |
|---|---|---|---|---|
| 2,662,634 | * | 12/1953 | Tines | 198/672 |
| 3,194,385 | * | 7/1965 | Barnese | 198/672 |
| 3,278,001 | * | 10/1966 | Andrews | 198/672 |
| 3,428,165 | * | 2/1969 | Boden | 198/672 |
| 3,770,109 | * | 11/1973 | Kraft | 198/672 |
| 5,263,572 | * | 11/1993 | Hove | 198/672 |
| 5,715,976 | * | 2/1998 | Kautz | 198/672 |
| 5,996,770 | * | 12/1999 | Kjellqvist | 198/672 |

FOREIGN PATENT DOCUMENTS

| | | | | |
|---|---|---|---|---|
| 1155-529A | * | 5/1985 | (SU) | 198/672 |
| 2626-196 | * | 5/1985 | (DE) | 198/672 |

* cited by examiner

*Primary Examiner*—Douglas Hess
(74) *Attorney, Agent, or Firm*—Robert E. Kleve

(57) ABSTRACT

The invention is auger drive bearing mechanism having an upward auger device having a center shaft with an auger formed about and along the shaft and a sleeve surrounding the auger shaft and auger. A bearing housing is mounted at the lower end of the auger shaft and a housing shaft has its upper end connected to the auger shaft, while the housing shaft has it lower end adapted to be mounted to the power take off shaft of a tractor for powering the shaft and auger. A dual pair of tapered bearings are mounted in the housing on the housing shaft with one tapered bearing having rollers angled downward and outward to withstand the axial downward trust load of the auger and weight of grain and other particles when augered upward by the auger in the sleeve. An opposed tapered bearing at the lower end of the bearing housing acts to hold the housing mechanism together.

2 Claims, 1 Drawing Sheet

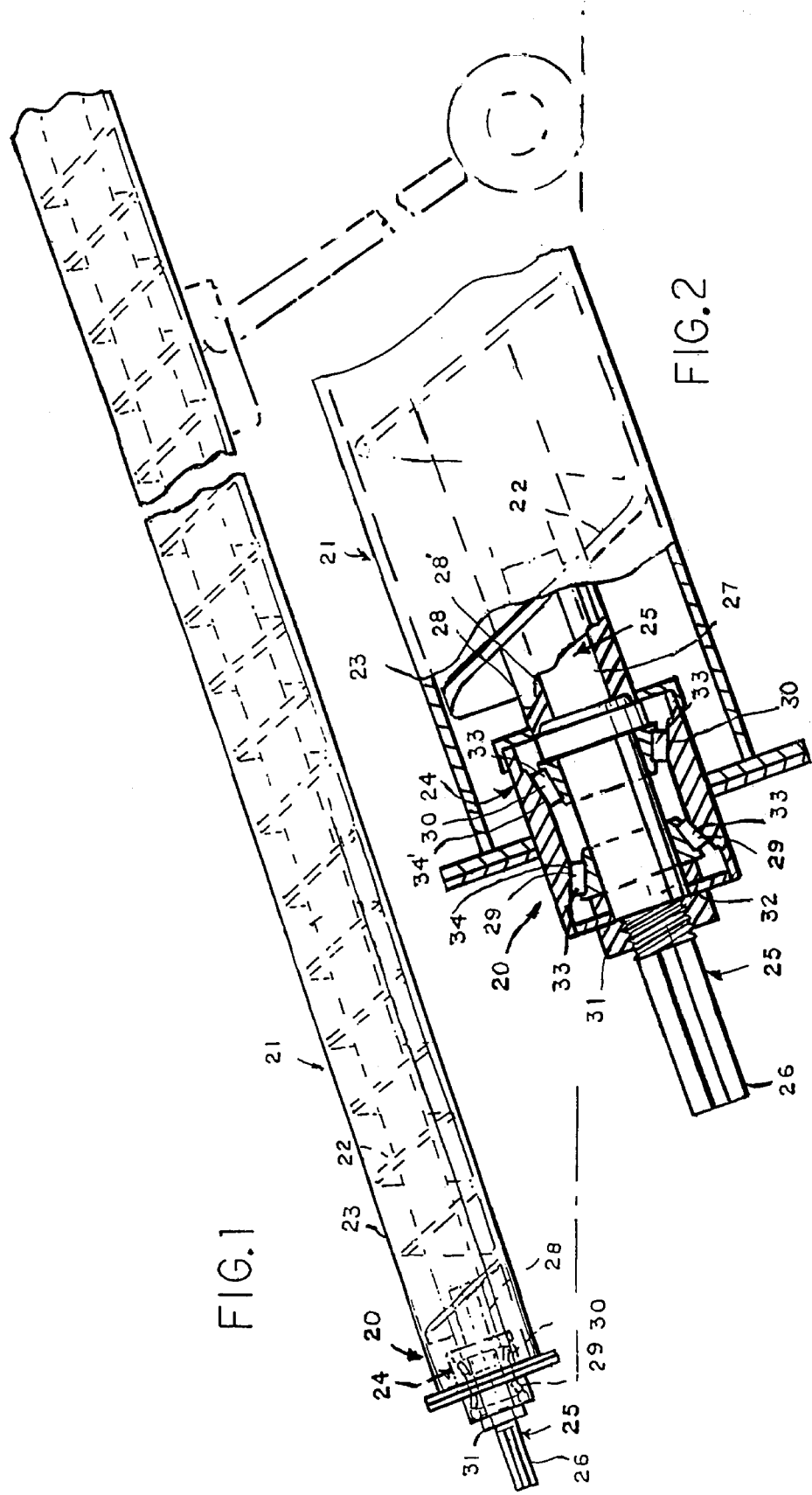

GRAIN AUGER BEARING DRIVE MECHANISM

This invention relates to upwardly auger drives, more particularly, the invention relates to upwardly inclined portable auger bearing drives.

It is an object of the invention to provide moved upward inclined auger bearing drive which provides a dual bearing surface to reduce the load on the bearing surface of the auger due to downward inclined longitudinal thrust of the auger load in relation to the longitudinal axis of rotation of the grain auger and its shaft when augering grain and the like at an upward inclined angle.

It is another object of the invention to provide a novel auger bearing drive mechanism for augering particles at an upward inclined angle along a sleeve.

It is a further object of the invention to provide a novel bearing augering mechanism for augering particles at an upward inclined angle which provides a bearing surface to counteract the downward inclined load of the auger and particles being augered in the opposed upward inclined direction.

Further objects and advantages of the invention will become apparent as the description proceeds and when taken in conjunction with the accompanying drawing wherein

BRIEF DESCRIPTION OF THE DRAWINGS

FIG. 1 is a side elevational view of the novel grain auger bearing drive mounted in the lower end of a portable upward inclined auger.

FIG. 2 is a fragmentary enlarged side elevational view of the auger bearing drive invention.

Briefly stated, the invention comprises a grain auger bearing drive device comprising a portable upwardly inclined elongated auger rotatably mounted in a upward inclined sleeve at an upward and forward inclined longitudinal axis for augering particles at a forward and upward angle in the sleeve. A bearing housing is mounted at the lower end of the auger shaft and a dual pair of tapered bearings, are mounted in the housing with one tapered bearing mounted in the housing with rollers angled downward and outward in relation to the longitudinal axis of the auger to counter act the downward load of the auger and particles being augered upward by the auger and the other tapered bearing being mounted with its rollers angles upward and outward to provide a bearing surface to hold the bearing assembly together.

BRIEF DESCRIPTION OF PREFERRED EMBODIMENTS

Referring more particularly to the drawings, in FIG. 1, the auger bearing drive mechanism invention 20 is shown in a portable auger 21. The portable auger 21 has an upward inclined elongated auger 22 rotably mounted in an upward inclined sleeve 23. A bearing housing 24 is mounted at the lower end of the auger 22. The bearing housing 24 has a center shaft 25 with a power take off slotted shaft portion 26 at its one end for mounting to the power take off of a conventional tractor (not shown) and a square exterior cross sectional auger connecting shaft portion 27 at its other end for mounting in the complementary hollow square cross sectional interior 28' of the auger shaft 28 of the auger 21. A pair of opposed annular tapered Timpkin ring type bearings 29 and 30 are mounted on the bearing shaft in opposed relation to one another on the center shaft 25. A threaded nut 31 is threaded onto the bearing shaft 25 against a cover plate 32 to hold the bearing mechanism 20 in place mounted on the center shaft 25 of the mechanism.

The tapered ring type bearings 29 and 30 each have plurality of conventional bearing rollers 33 which are rotatably mounted in the annular bearing frame 34 which frame is fixed to the center shaft 25 in an annular tapered frusto conical exterior position in a housing 24 and which rollers roll against the circular tapered frusto conical interior or inner surface 34 and 34' of the bearing housing 24 provide a roller bearing action for the bearing shaft 25 and the auger center shaft 25 rotate on the bearing housing in unison, with the rotation being powered by the power take off connection of the tractor.

The upper tapered bearing 30 acts like thrust bearing for the auger and act to hold and withstand the axial downward angular longitudinal thrust loads of the weight of the auger and the angular downward thrust load weight of the grain being augered upward at an opposed upward inclined angle in the sleeve of the portable grain auger. The weight of the auger and the weight of the grain being augered by the auger at an upward angle is substantial and conventional ball bearing rings do not provide a satisfactory bearing action to withstand these thrust loads.

While the auger load by the auger as well as the load by the grain being augered by the auger 22, is supported by the tapered bearing 29, the other tapered bearing 30 and the adjacent threaded nut 31 are used to hold the bearing assembly together in operative relation. A dust cap 35 is mounted at the upper end of the housing to prevent dust from entering into the bearing housing.

Thus it will be seen that a novel auger bearing drive for augers has bee provided that provides a dual action against axial as well as radial thrust upon the auger center shaft drive.

It will be obvious that various changes and departures may be made to the invention without departing from the spirit and scope thereof, and accordingly, it is not intended that the invention be limited to that specifically described in the specification or as illustrated in the drawing, but only as set forth in the appended claims wherein:

What is claimed is:

1. A auger drive mechanism for an upward inclined grain auger device having a center shaft with an auger surrounding the center shaft and a cylindrical sleeve surrounding the auger, said mechanism comprising a bearing drive housing mounted at the lower end of the auger shaft and a housing shaft in the housing detachably mounted at its upper end to the auger shaft, said housing shaft having its lower end adapted to be mounted to one joint of a universal connection with the other joint of the universal connection mounted to the power take off of a tractor, a dual pair of tapered bearings mounted in the housing on the housing shaft with one tapered bearing having rollers angled downward and outward to withstand the axial downward thrust load of the auger and the weight of the grain and other particles being augered upward by the auger in the auger sleeve, said other tapered bearing being at the lower end of the baring housing acting to hold the mechanism together.

2. An upward inclined auger device comprising an auger drive mechanism and an elongated forward upward inclined sleeve with an auger rotatably mounted in said sleeve, a housing at the lower end of said auger sleeve and a power shaft rotatably mounted in said housing having its upper end detachably mounted in said auger shaft and its lower end adapted to be mounted to a universal joint connection to a power take off of a tractor, dual tapered bearings mounted in said housing at the lower end of the inclined auger and sleeve, one of said tapered bearings having rollers rotatably mounted in a bearing housing mounted at the lower end of the sleeve at an upward lateral angle to the downward longitudinal axis of the auger to withstand the downward angular load of the auger along its longitudinal axis and withstand the load of particles being augered in an opposed upward angle along the longitudinal axis of the auger and sleeve, the other of said tapered bearings having rollers to hold the bearing assembly together in the housing.

* * * * *